United States Patent
Shih et al.

(10) Patent No.: US 10,002,305 B2
(45) Date of Patent: Jun. 19, 2018

(54) FISHEYE IMAGE DISPLAY METHOD

(71) Applicant: VIVOTEK INC., New Taipei (TW)

(72) Inventors: Yi-Hsuen Shih, New Taipei (TW);
Chien-Wen Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 5 days.

(21) Appl. No.: 15/450,014

(22) Filed: Mar. 5, 2017

(65) Prior Publication Data

US 2017/0255836 A1 Sep. 7, 2017

(30) Foreign Application Priority Data

Mar. 7, 2016 (TW) .............................. 105106834 A

(51) Int. Cl.
G06K 9/20 (2006.01)
G06T 3/00 (2006.01)
G09G 5/14 (2006.01)
G06F 3/0484 (2013.01)
G06F 3/0486 (2013.01)

(52) U.S. Cl.
CPC ......... G06K 9/2081 (2013.01); G06F 3/0486 (2013.01); G06F 3/04845 (2013.01); G06T 3/0018 (2013.01); G06T 3/0093 (2013.01); G09G 5/14 (2013.01); G09G 2340/045 (2013.01); G09G 2340/0492 (2013.01); G09G 2354/00 (2013.01)

(58) Field of Classification Search
CPC ................ G06T 3/0018; G06T 3/0093; G05B 2219/31473; H04N 5/23238
See application file for complete search history.

(56) References Cited

U.S. PATENT DOCUMENTS 8,515,130 B2    8/2013  Aragane
2006/0017807 A1* 1/2006 Lee ......................... B60R 1/00
                                                    348/36
2014/0184646 A1* 7/2014 Liu ........................ G06T 11/00
                                                    345/634

(Continued)

FOREIGN PATENT DOCUMENTS

TW    201230786 A1    7/2012
TW    201428685 A     7/2014

OTHER PUBLICATIONS

Screen shot of Vivotek Fisheye Solution YouTube video at 0:53/2:53, Iwatchs, downloaded on Apr. 26, 2018 from https://www.youtube.com/watch?v=eYrzwH14DoY, published on Dec. 7, 2014, one page.*

(Continued)

Primary Examiner — Jeffery A Brier
(74) Attorney, Agent, or Firm — Winston Hsu

(57) ABSTRACT

A fisheye image display method is adapted to a display device, wherein a display screen of the display device is divided into a plurality of view cells. The fisheye image display method includes steps of receiving a fisheye image; generating an original image and a plurality of regional images according to the fisheye image, wherein the regional images are corresponding to a plurality of regions of interest in the original image; and arranging the regional images in at least two of the view cells, wherein the at least two view cells are adjacent to each other horizontally or vertically, and one of the at least two view cells includes at least two of the regional images.

9 Claims, 10 Drawing Sheets

(56) References Cited

U.S. PATENT DOCUMENTS

2015/0091939 A1* 4/2015 Suzuki .............. H04N 5/23238
                                                            345/628

OTHER PUBLICATIONS

ST7501 Video Management Software User's Manual, Rev. 1.11, downloaded on Apr. 26, 2018 from http://download.vivotek.com/downloadfile/downloads/usersmanuals/st7501manual_en.pdf, pp. 1-221.*

FE8180 Fixed Dome Network Camera User's Manual, Rev. 1.0, downloaded on Apr. 26, 2018 from http://download.vivotek.com/downloadfile/downloads/usersmanuals/fe8180manual_en.pdf, pp. 1-219.*

* cited by examiner

FISHEYE IMAGE DISPLAY METHOD

CROSS REFERENCE TO RELATED APPLICATION

This application claims the benefit of Taiwan Application No. 105106834, which was filed on Mar. 7, 2016, and is incorporated herein by reference.

BACKGROUND OF THE INVENTION

1. Field of the Invention

The invention relates to a fisheye image display method and, more particularly, to a fisheye image display method arranging a plurality of regional images of a fisheye image in at least two adjacent view cells.

2. Description of the Prior Art

Since safety awareness is being raised gradually, people pay much attention to safety surveillance application. So far in many public or non-public places, there are always one or more cameras installed for safety surveillance. Since a fisheye lens has a characteristic of ultra-wide-angle, many cameras usually use the fisheye lens to capture an image of overall space. After the camera receives a fisheye image, a display device generates an original image according to the fisheye image. A user can select a plurality of regions of interest (ROI) from the original image, so as to monitor the selected regions of interest. At this time, the display device will dewarp the regions of interest, so as to further generate a plurality of regional images corresponding to the regions of interest.

Referring to FIG. 1, FIG. 1 is a schematic diagram illustrating a display device 1 of the prior art. As shown in FIG. 1, eight regional images R1-R8 are corresponding to eight regions of interest ROI1-ROI8 in an original image O and a display screen 10 of the display device 1 is divided into nine view cells 10a-10i. The prior art arranges one original image O and eight regional images R1-R8 in a 3×3 matrix and displays all of the nine images in one single view cell 10a. Furthermore, the other eight view cells 10b-10i display other monitored images I1-I8 transmitted from other cameras, respectively.

The size of the view cell 10a is one ninth of the display screen 10. If one original image O and eight regional images R1-R8 are displayed in one single view cell 10a, all images are packed with each other, such that the user cannot watch the details of each image clearly. Still further, since the user has selected the regions of interest ROI1-ROI8 from the original image O, it means that the regional images R1-R8 corresponding to the regions of interest ROI1-ROI8 are very important and the user needs not to watch the original image O temporarily. If the original image O is still displayed in the view cell 10a, the space for displaying the regional images R1-R8 is reduced and the screen is in a disorderly state accordingly. Moreover, since the regional images R1-R8 are arranged around the original image O circularly, the user has to watch the regional images R1-R8 in different lines, such that the user may feel visual fatigue easily due to discontinuous visual effect and cannot promptly perceive that each of the regional images R1-R8 is corresponding to which region of interest in the original image O.

SUMMARY OF THE INVENTION

An objective of the invention is to provide a fisheye image display method arranging a plurality of regional images of a fisheye image in at least two adjacent view cells, so as to solve the aforesaid problems.

According to an embodiment of the invention, a fisheye image display method is adapted to a display device, wherein a display screen of the display device is divided into a plurality of view cells. The fisheye image display method comprises steps of receiving a fisheye image; generating an original image and a plurality of regional images according to the fisheye image, wherein the regional images are corresponding to a plurality of regions of interest in the original image; and arranging the regional images in at least two of the view cells, wherein the at least two view cells are adjacent to each other horizontally or vertically, and one of the at least two view cells comprises at least two of the regional images.

As mentioned in the above, the invention arranges a plurality of regional images of the fisheye image in at least two adjacent view cells, so as to magnify each of the regional images, such that a user can watch the details of each regional image clearly. Furthermore, since the regional images are arranged in horizontal or vertical adjacent view cells, the user can watch each of the regional images directly in horizontal or vertical direction without skipping a line and the visual effect is continuous. Accordingly, the user can watch the regional images easily and can directly perceive that each of the regional images is corresponding to which region of interest in the original image.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
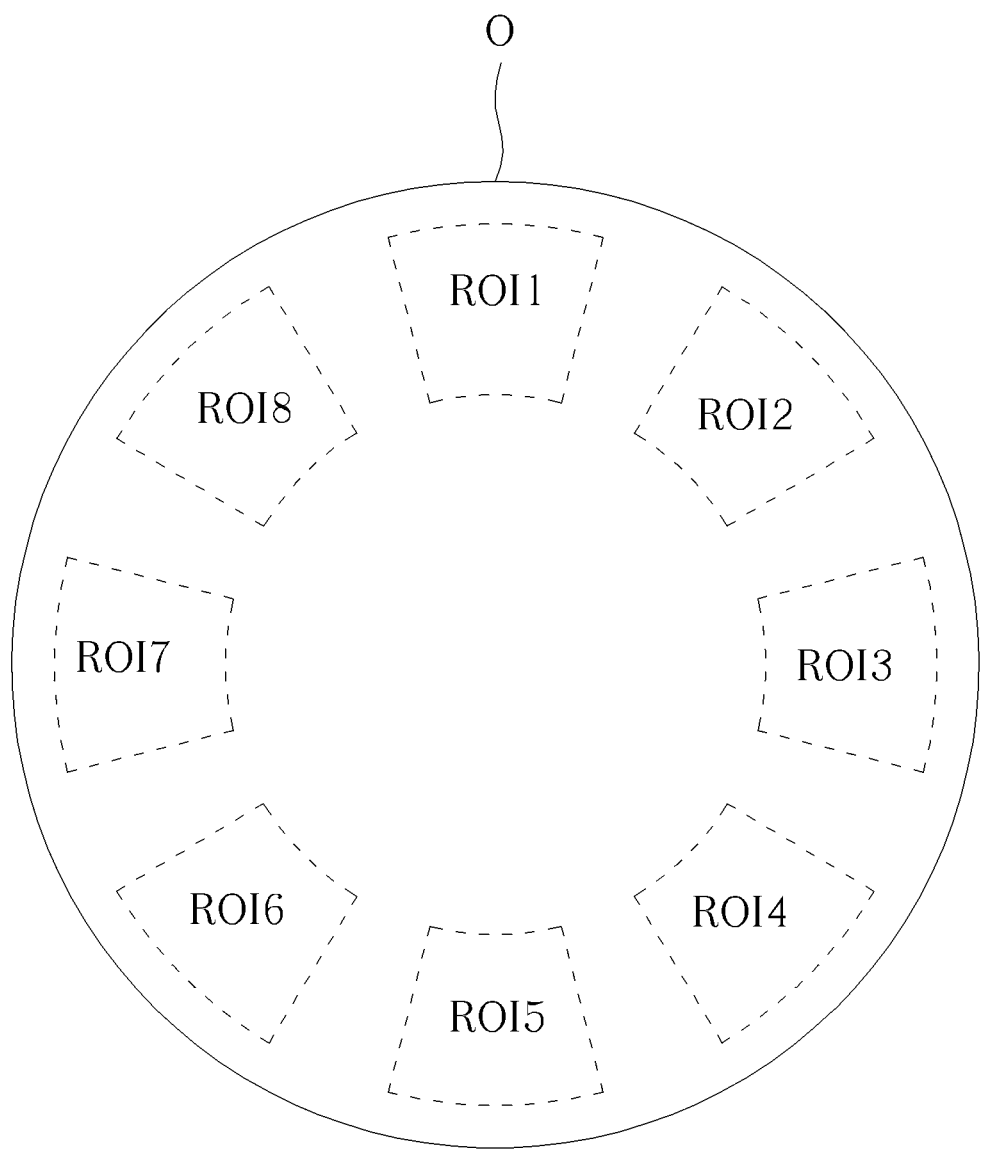
FIG. 2 is a schematic diagram illustrating an original image generated according to a fisheye image.
Figure 3:
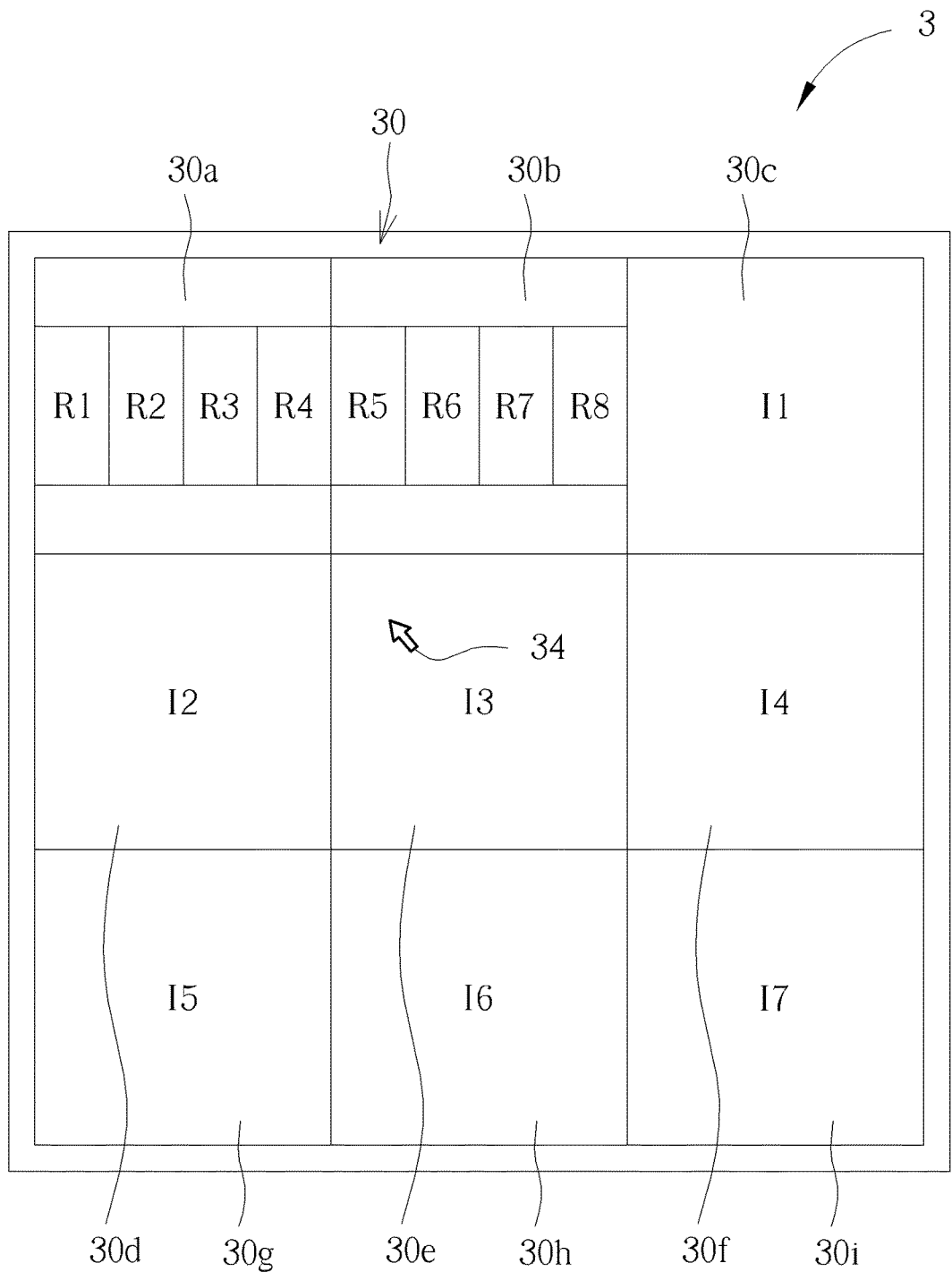
FIG. 3 is a schematic diagram illustrating a display device according to an embodiment of the invention.
Figure 4:
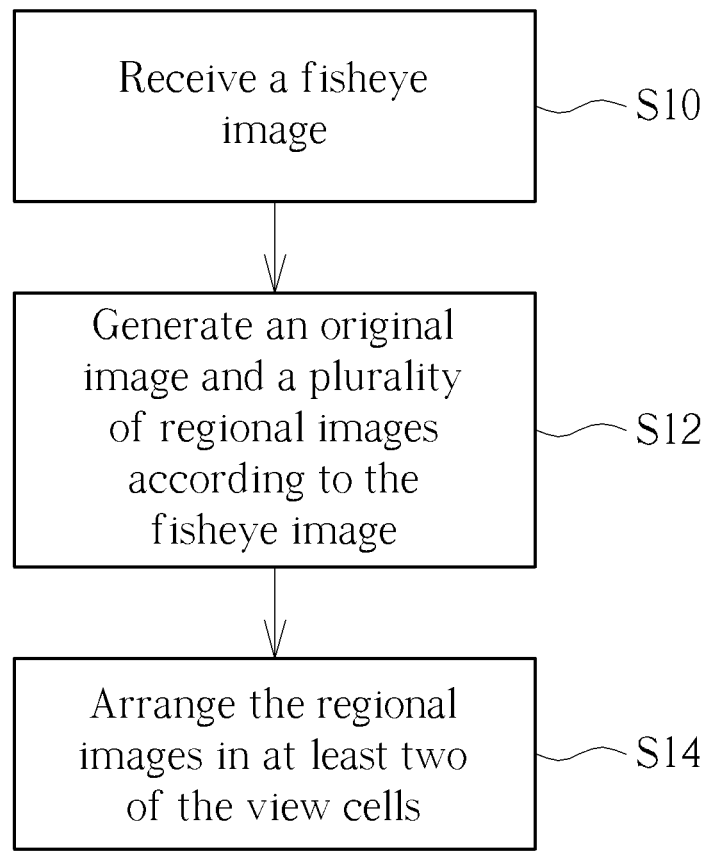
FIG. 4 is a flowchart illustrating a fisheye image display method according to an embodiment of the invention.

Referring to FIGS. 2 to 4, FIG. 2 is a schematic diagram illustrating an original image O generated according to a fisheye image, FIG. 3 is a schematic diagram illustrating a display device 3 according to an embodiment of the invention, and FIG. 4 is a flowchart illustrating a fisheye image display method according to an embodiment of the invention. The fisheye image display method shown in FIG. 4 is adapted to the display device 3 shown in FIG. 3, wherein the display device 3 may be a computer screen, a monitor, a television, a tablet computer or other electronic devices with display function. As shown in FIG. 3, a display screen 30 of the display device 3 is divided into a plurality of view cells 30a-30i. In this embodiment, the display screen 30 is divided into nine view cells 30a-30i. However, in another embodiment, the display screen 30 may also be divided into other number of view cells according to practical applications.

When the display device 3 is monitoring a place, first of all, the display device 3 receives a fisheye image from a camera (not shown) equipped with a fisheye lens (step S10 in FIG. 4). Then, the display device 3 generates an original image O and a plurality of regional images R1-R8 according to the fisheye image, wherein the regional images R1-R8 are corresponding to a plurality of regions of interest ROI1-ROI8 in the original image O (step S12 in FIG. 4). In this embodiment, after receiving the fisheye image from the camera, the display device 3 generates the original image O according to the fisheye image first, as shown in FIG. 2. A user may select eight regions of interest ROI1-ROI8 from the original image O, so as to monitor the regions of interest ROI1-ROI8. At this time, the display device 3 will dewarp the regions of interest ROIL-ROI8, so as to further generate eight regional images R1-R8 corresponding to the regions of interest ROI1-ROI8, as shown in FIG. 3. It should be noted that the user may also select other number of regions of interest from the original image O according to practical applications, so as to generate other number of region images. In practical applications, the invention may rotate and calibrate directions of the regional images R1-R8 before displaying the regional images R1-R8, so as to rotate the regional images R1-R8 to a correct direction capable of being directly perceived by human eyes. Furthermore, the invention may dewarp the regional images R1-R8 before displaying the regional images R1-R8.

Then, the display device 3 arranges the regional images R1-R8 in at least two of the view cells 30a-30i, wherein the at least two view cells are adjacent to each other horizontally or vertically, and one of the at least two view cells comprises at least two of the regional images R1-R8 (step S14 in FIG. 4). In this embodiment, the display device 3 arranges the regional images R1-R8 in two horizontal adjacent view cells 30a, 30b of the view cells 30a-30i, wherein the view cell 30a comprises four regional images R1-R4 of the regional images R1-R8 and the view cell 30b comprises four regional images R5-R8 of the regional images R1-R8. Furthermore, the other seven view cells 30c-30i display other monitored images I1-I7 transmitted from other cameras, respectively.

Figure 1:
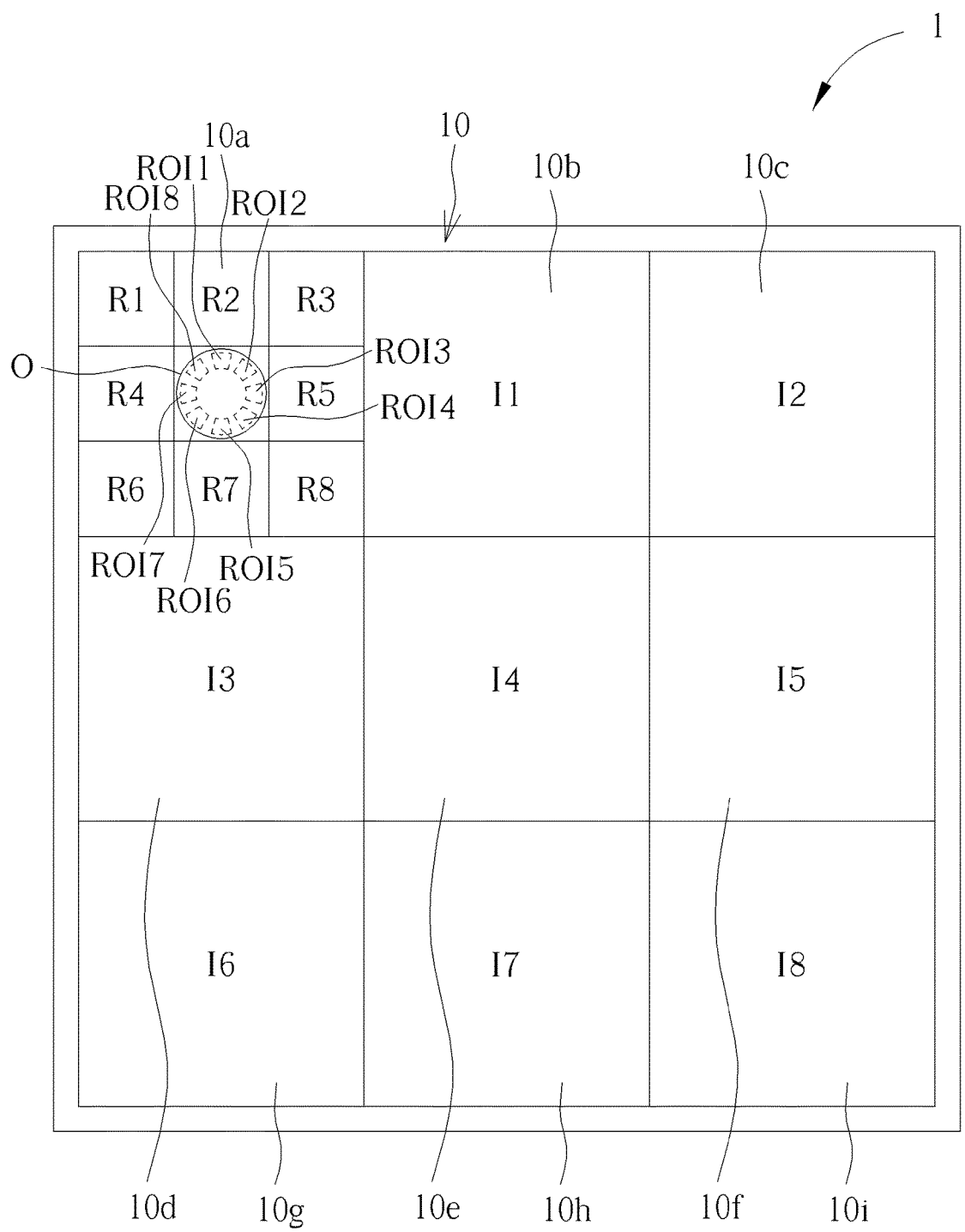
FIG. 1 is a schematic diagram illustrating a display device of the prior art.

Comparing the prior art shown in FIG. 1 with the embodiment of the invention shown in FIG. 3, each of the regional images R1-R8 can be magnified since the invention arranges the regional images R1-R8 in two adjacent view cells 30a, 30b, such that the user can watch the details of each regional image R1-R8 clearly. Furthermore, since the regional images R1-R8 are arranged in horizontal adjacent view cells 30a, 30b, the user can watch each of the regional images R1-R8 directly in horizontal direction without skipping a line and the visual effect is continuous. Accordingly, the user can watch the regional images R1-R8 easily and can directly perceive that each of the regional images R1 -R8 is corresponding to which region of interest in the original image O. Moreover, the original image O shown in FIG. 2 is not displayed in the display screen 30 shown in FIG. 3, so the user will not be interfered by the original image O when the user is watching the regional images R1-R8.

It should be noted that the arrangement of the regional images R1-R8 is not limited to the embodiment shown in FIG. 3. For example, the invention may also arrange the regional images R1-R8 in three horizontal adjacent view cells 30a, 30b, 30c, wherein the view cell 30a may comprise three regional images R1-R3, the view cell 30b may comprise three regional images R4-R6, and the view cell 30c may comprise two regional images R7-R8. Accordingly, the arrangement of the regional images R1-R8 may be determined according to practical applications.

Figure 5:
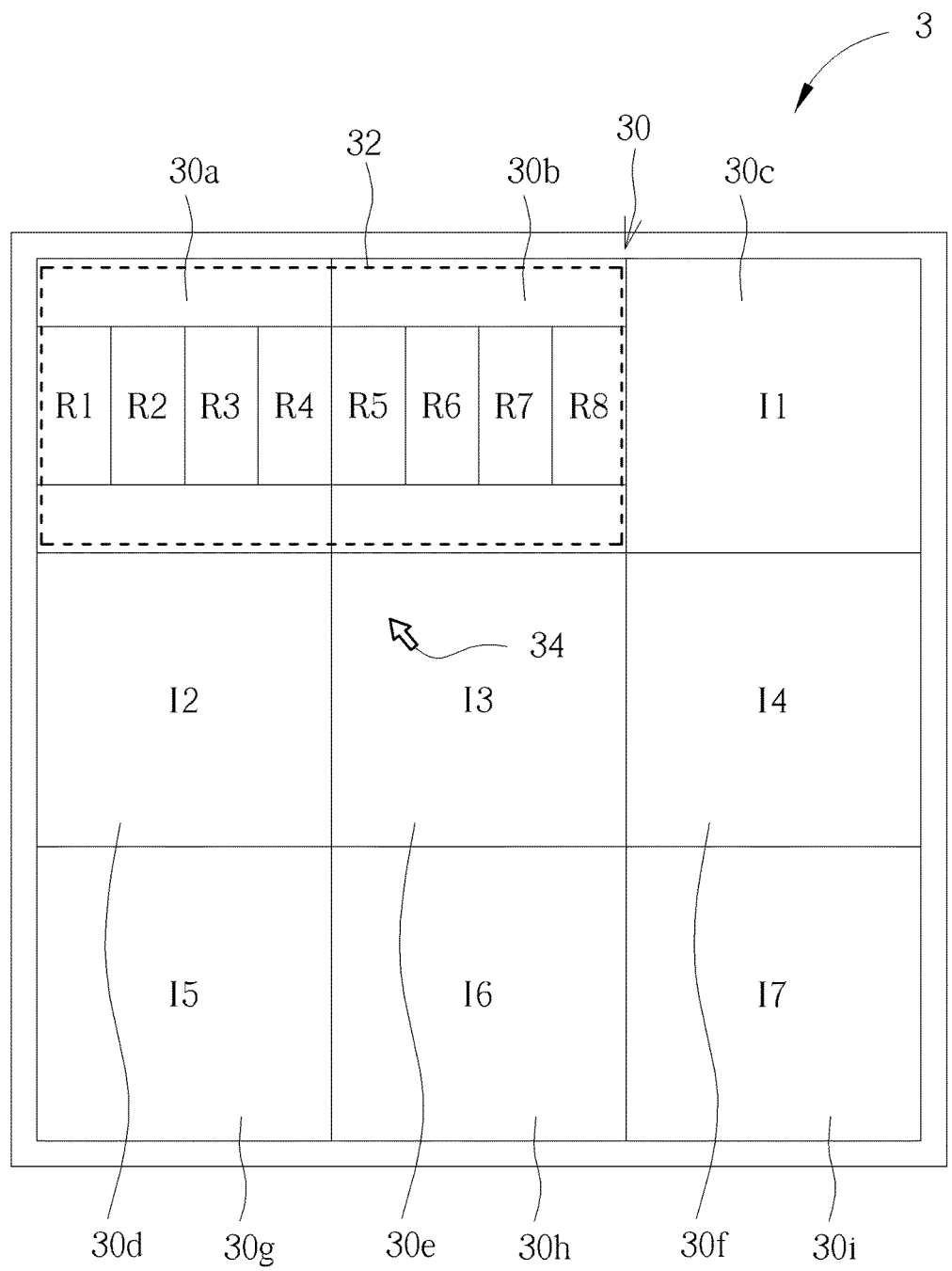
FIG. 5 is a schematic diagram illustrating a frame displayed around two view cells.

Referring to FIG. 5, FIG. 5 is a schematic diagram illustrating a frame 32 displayed around two view cells 30a, 30b. As shown in FIG. 5, since the regional images R1-R8 in the two view cells 30a, 30b are corresponding to the original image O, the invention may display a frame 32 around the two view cells 30a, 30b, so as to indicate that the regional images R1-R8 in the two view cells 30a, 30b are corresponding to the original image O for the user. In this embodiment, the frame 32 is rectangular. However, in another embodiment, the frame 32 may also be oval-shaped or other shapes according to practical applications.

Figure 6:
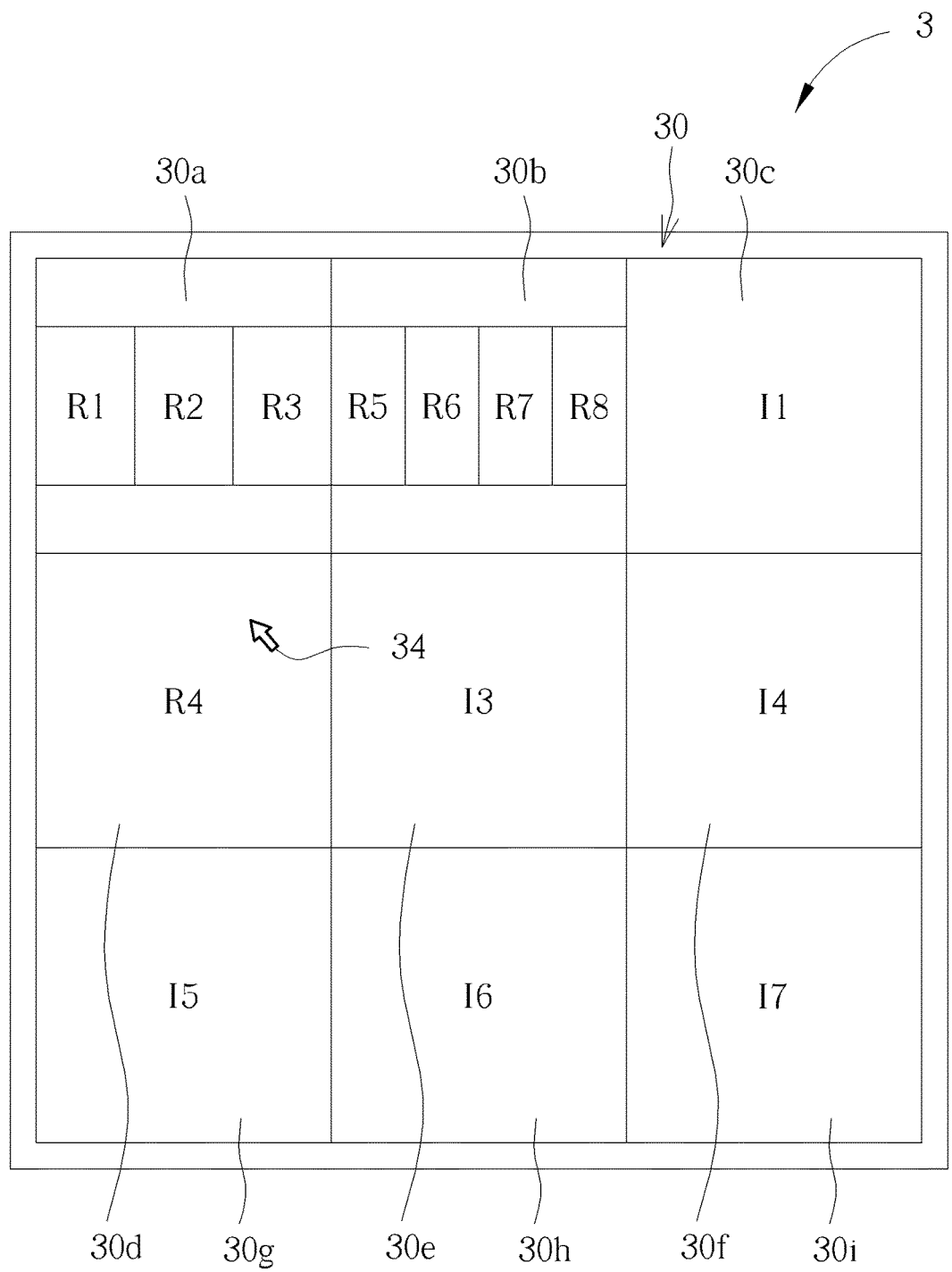
FIG. 6 is a schematic diagram illustrating the regional image dragged to a position beyond two view cells.

Referring to FIG. 6, FIG. 6 is a schematic diagram illustrating the regional image R4 dragged to a position beyond two view cells 30a, 30b. In this embodiment, the invention allows at least one of the regional images R1-R8 to be dragged to any view cell 30c-30i beyond the two view cells 30a, 30b. As shown in FIG. 6, the user may use a cursor 34 to drag the regional image R4 to the view cell 30d beyond the two view cells 30a, 30b, so as to magnify the regional image R4 in the view cell 30d. At this time, the monitored image I2 originally shown in the view cell 30d is covered by the regional image R4. In another embodiment, the invention may also display the monitored images I2-I6 in the view cells 30e-30i and hide the monitored image I7.

Figure 7:
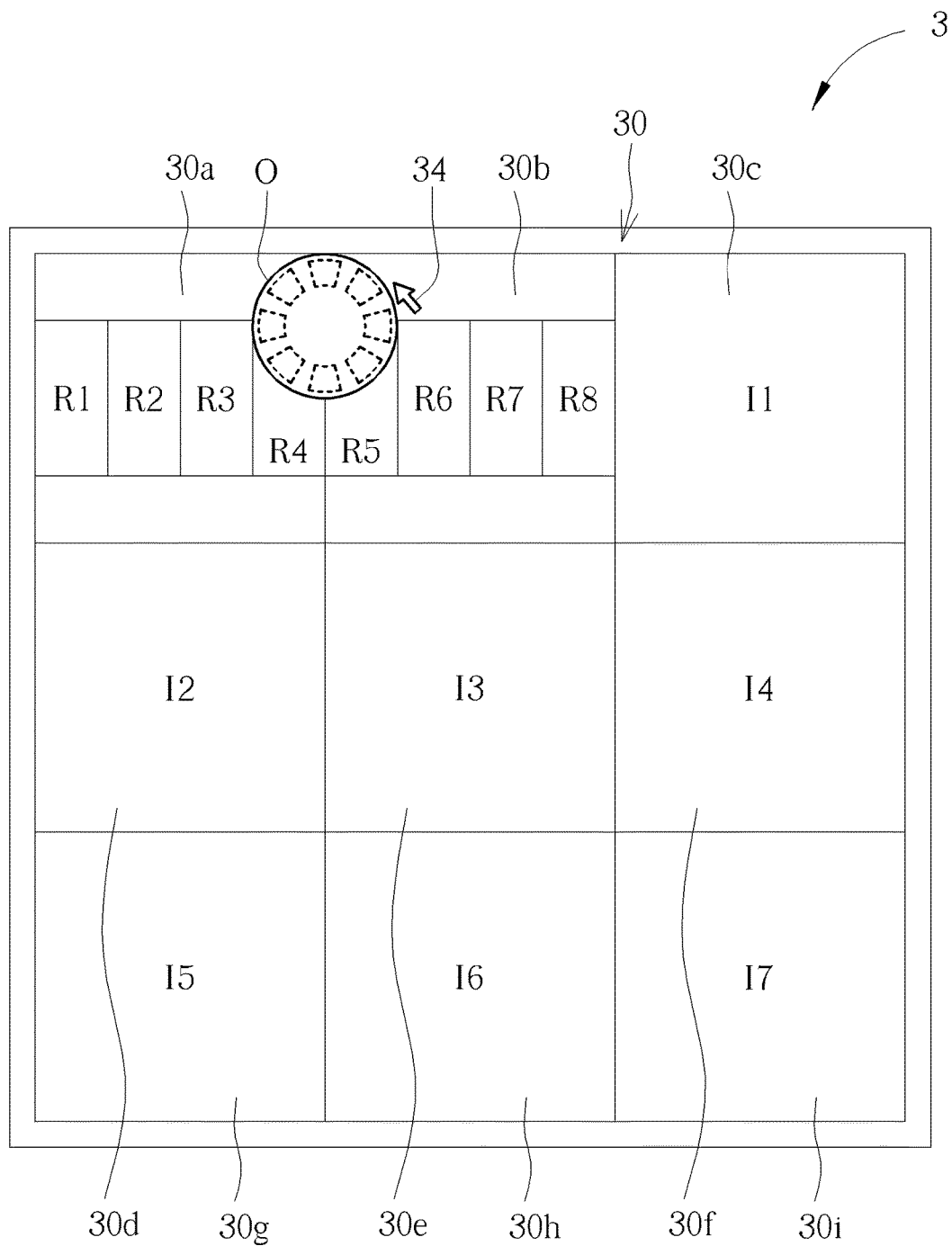
FIG. 7 is a schematic diagram illustrating the original image displayed at a position corresponding to the cursor.
Figure 8:
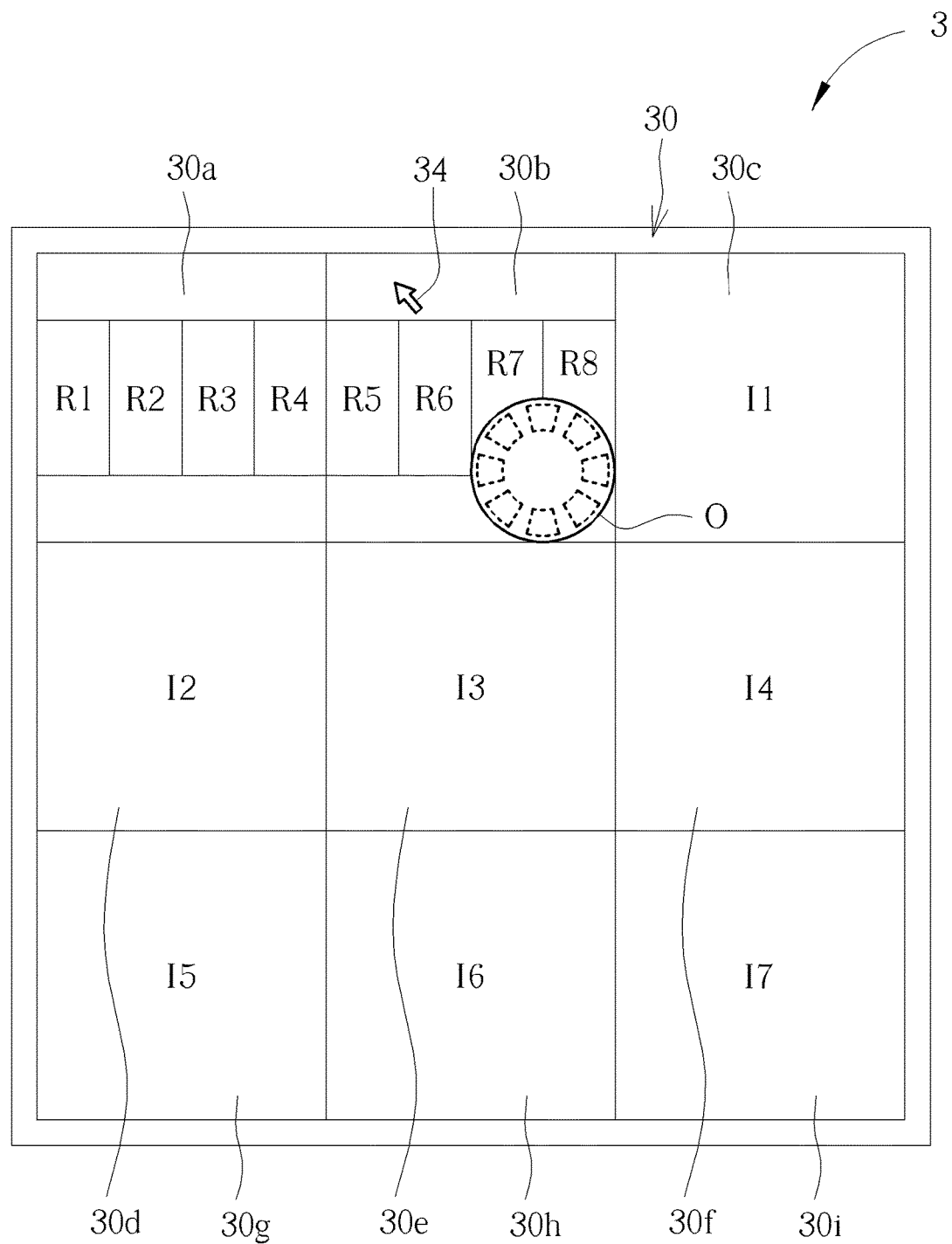
FIG. 8 is a schematic diagram illustrating the original image displayed at a predetermined position.

Referring to FIGS. 7 and 8, FIG. 7 is a schematic diagram illustrating the original image O displayed at a position corresponding to the cursor 34 and FIG. 8 is a schematic diagram illustrating the original image O displayed at a predetermined position. As shown in FIG. 7, when the cursor 34 moves into one of the two view cells 30a, 30b, the invention may display the original image O at a position corresponding to the cursor 34. As shown in FIG. 8, when the cursor 34 moves into one of the two view cells 30a, 30b, the invention may display the original image O at a predetermined position, e.g. a lower right corner of the view cell 30b.

In other words, when the user wants to recognize that the regional images R1-R8 are located at which position of the original image O, the user may move the cursor 34 into one of the two view cells 30a, 30b, so as to bring out the original image O. After bringing out the original image O, the user may further zoom and/or rotate one of the regions of interest ROI1-ROI8, so as to zoom and/or rotate one of the regional images R1-R8 correspondingly. Needless to say, the user may also add/delete a region of interest and/or modify a range covered by a region of interest within the original image O, so as to add/delete a regional image and/or modify a range covered by a regional image correspondingly. Furthermore, the invention may further allow the original image O to be dragged to a random position within the two view cells 30a, 30b. As shown in FIG. 7, since the original image O covers parts of the regional images R4, R5, the user may operate the cursor 34 to drag the original image O to other positions within the two view cells 30a, 30b, so as to expose the regional images R4, R5 completely.

Figure 9:
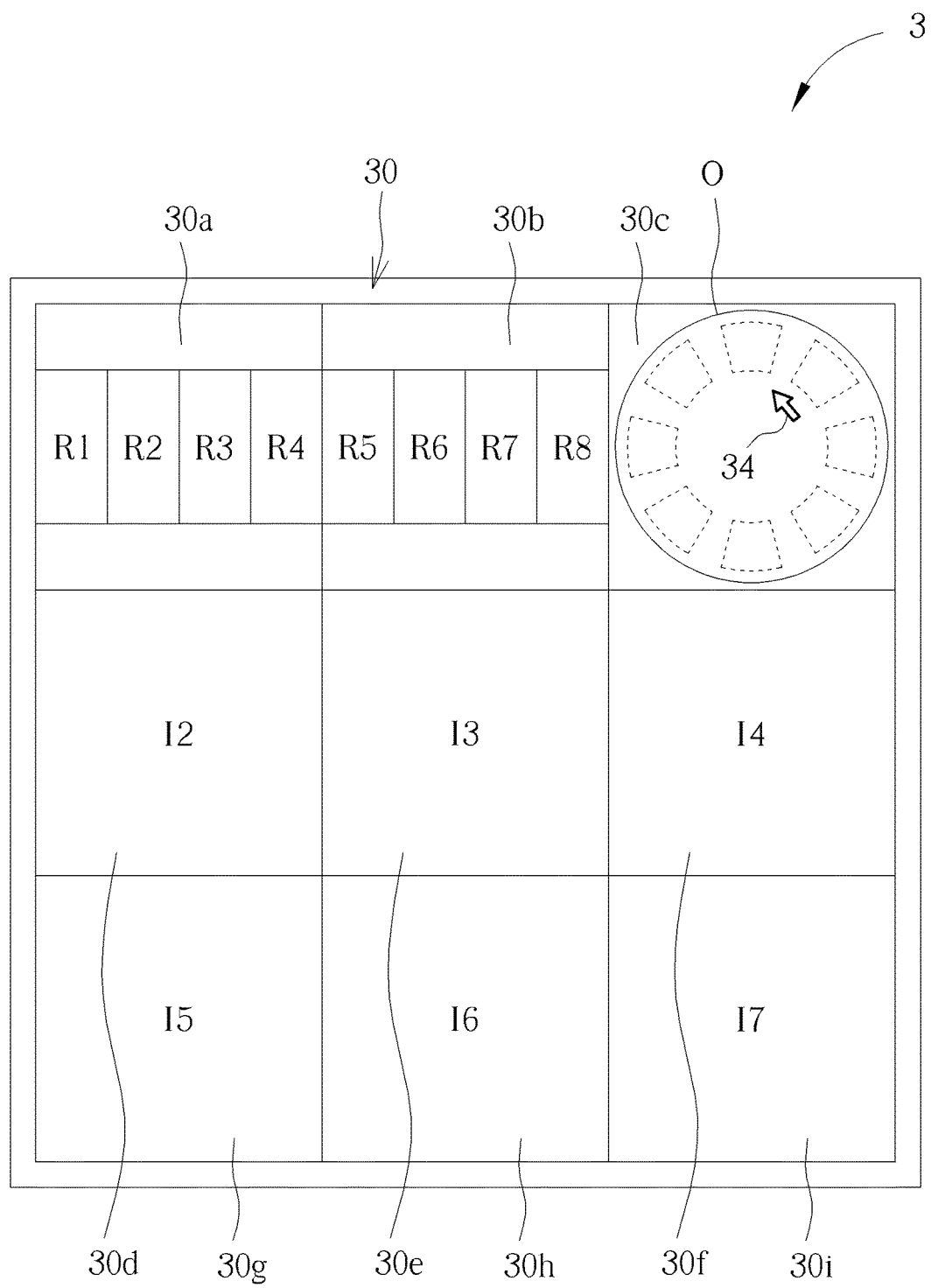
FIG. 9 is a schematic diagram illustrating the original image dragged to a position beyond two view cells.

Referring to FIG. 9, FIG. 9 is a schematic diagram illustrating the original image O dragged to a position beyond two view cells 30a, 30b. In this embodiment, the invention allows the original image O to be dragged to any view cell 30c-30i beyond the two view cells 30a, 30b. As shown in FIG. 9, the user may use the cursor 34 to drag the original image O to the view cell 30c beyond the two view cells 30a, 30b, so as to magnify the original image O in the view cell 30c. At this time, the monitored image I1 originally shown in the view cell 30c is covered by the original image O. In another embodiment, the invention may also display the monitored images I1-I6 in the view cells 30d-30i and hide the monitored image I7.

Figure 10:
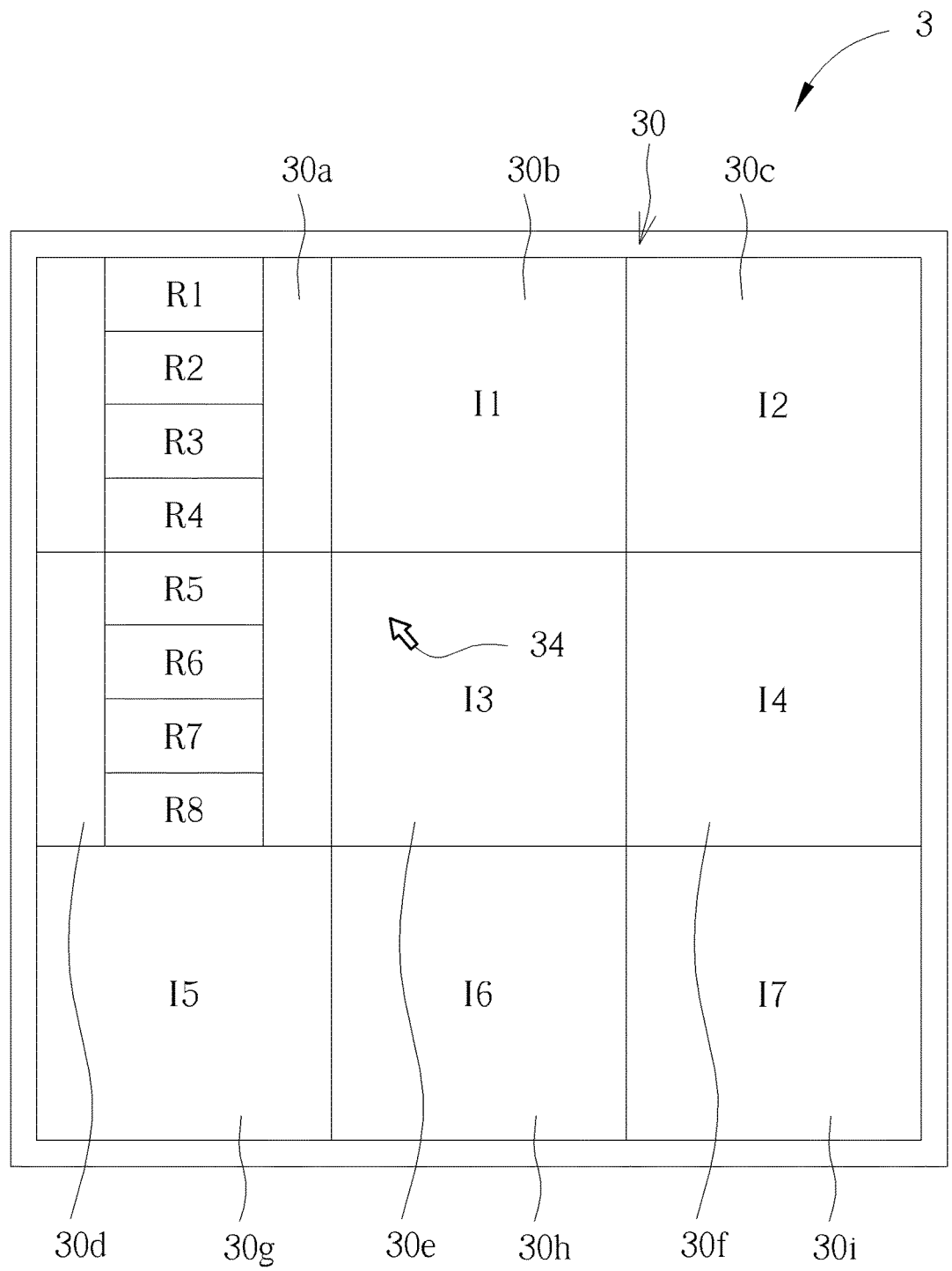
FIG. 10 is a schematic diagram illustrating the regional images arranged in two vertical adjacent view cells.

Referring to FIG. 10, FIG. 10 is a schematic diagram illustrating the regional images R1-R8 arranged in two vertical adjacent view cells 30a, 30d. As shown in FIG. 10, the invention may also arrange the regional images R1-R8 in two vertical adjacent view cells 30a, 30d of the view cells 30a-30i, wherein the view cell 30a comprises four regional images R1-R4 of the regional images R1-R8 and the view cell 30d comprises four regional images R5-R8 of the regional images R1-R8. Since the regional images R1-R8 are arranged in vertical adjacent view cells 30a, 30d, the user can watch each of the regional images R1-R8 directly in vertical direction without skipping a line and the visual effect is continuous. Accordingly, the user can watch the regional images R1-R8 easily. The arrangement shown in FIG. 10 is adapted to a narrow and long scene, e.g. a lane or a corridor.

Therefore, the user may display the regional images R1-R8 by the horizontal arrangement shown in FIG. 3 or the vertical arrangement shown in FIG. 10 according to practical requirement of the scene. Furthermore, the embodiments shown in FIGS. 5 to 9 are also adapted to the embodiment shown in FIG. 10.

It should be noted that the control logic of the fisheye image display method of the invention can be implemented by software. The software can be executed in a display device. Needless to say, each part or function of the control logic may be implemented by software, hardware or the combination thereof.

As mentioned in the above, the invention arranges a plurality of regional images of the fisheye image in at least two adjacent view cells, so as to magnify each of the regional images, such that a user can watch the details of each regional image clearly. Furthermore, since the regional images are arranged in horizontal or vertical adjacent view cells, the user can watch each of the regional images directly in horizontal or vertical direction without skipping a line and the visual effect is continuous. Accordingly, the user can watch the regional images easily and can directly perceive that each of the regional images is corresponding to which region of interest in the original image. Moreover, the original image is not displayed in the display screen before the user brings out the original image, so the user will not be interfered by the original image when the user is watching the regional images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fisheye image display method adapted to a display device, a display screen of the display device being divided into a plurality of view cells, the fisheye image display method comprising steps of:
   receiving a fisheye image;
   generating an original image and a plurality of regional images according to the fisheye image, wherein the regional images are corresponding to a plurality of regions of interest in the original image; and
   arranging the regional images in at least two of the view cells, wherein the at least two view cells are adjacent to each other horizontally or vertically, and one of the at least two view cells comprises at least two of the regional images.

2. The fisheye image display method of claim 1, further comprising step of:
   when a cursor moves into one of the at least two view cells, displaying the original image at a position corresponding to the cursor or at a predetermined position.

3. The fisheye image display method of claim 2, further comprising step of:
   allowing the original image to be dragged to a random position within the at least two view cells.

4. The fisheye image display method of claim 2, further comprising step of:
   allowing the original image to be dragged to any view cell beyond the at least two view cells.

5. The fisheye image display method of claim 2, further comprising step of:
   zooming and/or rotating one of the regions of interest, so as to zoom and/or rotate one of the regional images correspondingly.

6. The fisheye image display method of claim 1, further comprising step of:
   displaying a frame around the at least two view cells, so as to indicate that the regional images in the at least two view cells are corresponding to the original image.

7. The fisheye image display method of claim 1, further comprising step of:
   allowing at least one of the regional images to be dragged to any view cell beyond the at least two view cells.

8. The fisheye image display method of claim 1, further comprising step of:
   rotating and calibrating directions of the regional images before displaying the regional images.

9. The fisheye image display method of claim 1, further comprising step of:
   dewarping the regional images before displaying the regional images.

* * * * *